United States Patent [19]

Nasica

[11] 3,709,643
[45] Jan. 9, 1973

[54] APPARATUS FOR PRODUCING CONTAINERS WITH COMPLEX WALLS

[75] Inventor: Jean R. Nasica, Paris, France

[73] Assignee: Intercan S.A., c/o Fiduciaire Wanner S.A., Fribourg, Switzerland

[22] Filed: July 12, 1971

[21] Appl. No.: 161,872

Related U.S. Application Data

[63] Continuation of Ser. No. 18,123, March 10, 1970, abandoned.

[52] U.S. Cl. ............... 425/109, 425/122, 425/308, 425/324, 156/510, 83/408, 83/926, 264/92, 264/160
[51] Int. Cl. ....... B29c 17/04, B29c 27/18, B32b 3/18
[58] Field of Search....18/4 R, 4 AP, 5 R, 19 R, 19 P, 18/19 F, 19 H, 35; 264/92, 94, 130, 152, 255, 160, 263; 425/109, 116, 122, 308, 325, 324

[56] References Cited

UNITED STATES PATENTS

| | | | |
|---|---|---|---|
| 2,805,787 | 9/1957 | Sherman | 264/94 X |
| 3,113,831 | 12/1963 | Coale | 264/94 X |
| 3,318,985 | 5/1967 | Turner et al. | 264/94 X |
| 2,881,475 | 4/1959 | Wilckens | 18/DIG. 6 |
| 3,453,162 | 7/1969 | Turner | 18/19 F X |
| 2,162,230 | 6/1939 | Salfisberg | 156/510 X |
| 2,761,803 | 9/1956 | Breitenback | 264/152 X |
| 3,392,223 | 7/1968 | Thiel | 264/152 |
| 3,453,162 | 7/1969 | Turner | 18/19 F X |

*Primary Examiner*—Robert L. Spicer, Jr.
*Attorney*—Saul Jecies

[57] ABSTRACT

This invention relates to an apparatus for producing in moulds plastic containers having one part at least of their lateral walls a reinforcing sheet.

This apparatus is particular in that associated with each female mould is a device for forming a loop in the reinforcing sheet, and a member for placing said loop in the corresponding mould, and that said mould is disposed on a carrier so as to be capable of coming into alignment with the loop forming device, and that means are provided to control, stepwise and sequentially, the formation of a loop in the reinforcing sheet, the alignment of the mould and the forming device, the introduction of the loop into the mould, the resetting of the mould into the shaping position, and the shaping of a container with complex walls.

28 Claims, 12 Drawing Figures

Fig.1

Inventor
Jean R. Nasica
By [signature]
His Attorney

APPARATUS FOR PRODUCING CONTAINERS WITH COMPLEX WALLS

This is a streamline continuation application of Ser. No. 18,123, now abandoned.

The present invention concerns an apparatus for producing containers with complex walls made from a thermoplastic sheet, in particular for wrapping food stuffs and/or pharmaceutical products. The term containers with complex walls is used to denote containers of which at least a part of the lateral wall is covered with a decorated or undecorated reinforcing sheet. These reinforcing sheets are of any nature whatever, for example made of cardboard, thermoplastic material, aluminum, etc, and, on the side which is intended to come into contact with the lateral wall of the container are coated with a heat-sticking material which adheres intimately to the lateral wall of the thermoplastic container.

The principal of production of containers of this nature with complex or reinforced walls has long been known, and comprises placing the reinforcing sheet in a female mould, placing a previously heated thermoplastic sheet on the opening of the female mould, pre-forming a container blank by means of a punch which deforms said thermoplastic sheet while it penetrates into the mould, and completing shaping of the container by means of a fluid under pressure applied to the blank on the side of the punch and pushing said blank against the wall of the mould, the blank adhering intimately to the reinforcing sheet previously disposed in the mould.

Hitherto, the reinforcing sheet could not be placed in the female mould simultaneously in a plurality of juxtaposed moulds as the flat surface of a reinforcing sheet interfered with the adjacent sheet and the correct positioning thereof in the mould. In addition, if mechanical means were provided for positioning the sheets, their bulk would also cause mutual interference of the different means. It can easily be seen that this method of producing complex containers becomes prohibitive when large quantities of such containers were to be produced in a short time.

The present invention overcomes this disadvantage, and proposes providing an apparatus for producing containers with complex walls, for wrapping food stuffs and/or pharmaceutical products, which apparatus requires no manual intervention in the production of such containers, and which enables a high production rate to be attained.

The apparatus for producing containers with complex walls, comprising on a frame, a cylindrical support for a roll of thermoplastic material sheet, means for transporting said sheet below a heating station, then into a shaping station comprising on one side of the thermoplastic sheet at least one series of female moulds which are movable perpendicularly to the plane of the thermoplastic sheet and which extend over the entire width of said sheet, and on the other side, a series of pre-shaping punches of which the number corresponds to the number of moulds, a series of mould clamps intended to apply said thermoplastic sheet against the upper end of the moulds, and a source of pressure fluid for the definitive shaping of the containers, said apparatus being characterized in that associated with each female mould is a device for forming a loop in the reinforcing sheet, and a member for placing said loop in the corresponding mould, and that said mould is disposed on a carrier so as to be capable of coming into alignment with the loop forming device, and that means are provided to control, stepwise and sequentially, the formation of a loop in the reinforcing sheet, the alignment of the mould and the forming device, the introduction of the loop into the mould, the re-setting of the mould into the shaping position, and the shaping of a container with complex walls.

In this way, containers with complex walls can be produced uninterruptedly so that the apparatus can be combined with the filling, sealing, severing, and possibly, over-wrapping stations, in order to form a complete chain of wrappings for food stuff products.

Comprehension of the invention will be facilitated by means of the following description of an embodiment given only by way of example, with reference to the accompanying drawings in which.

Figure 1:
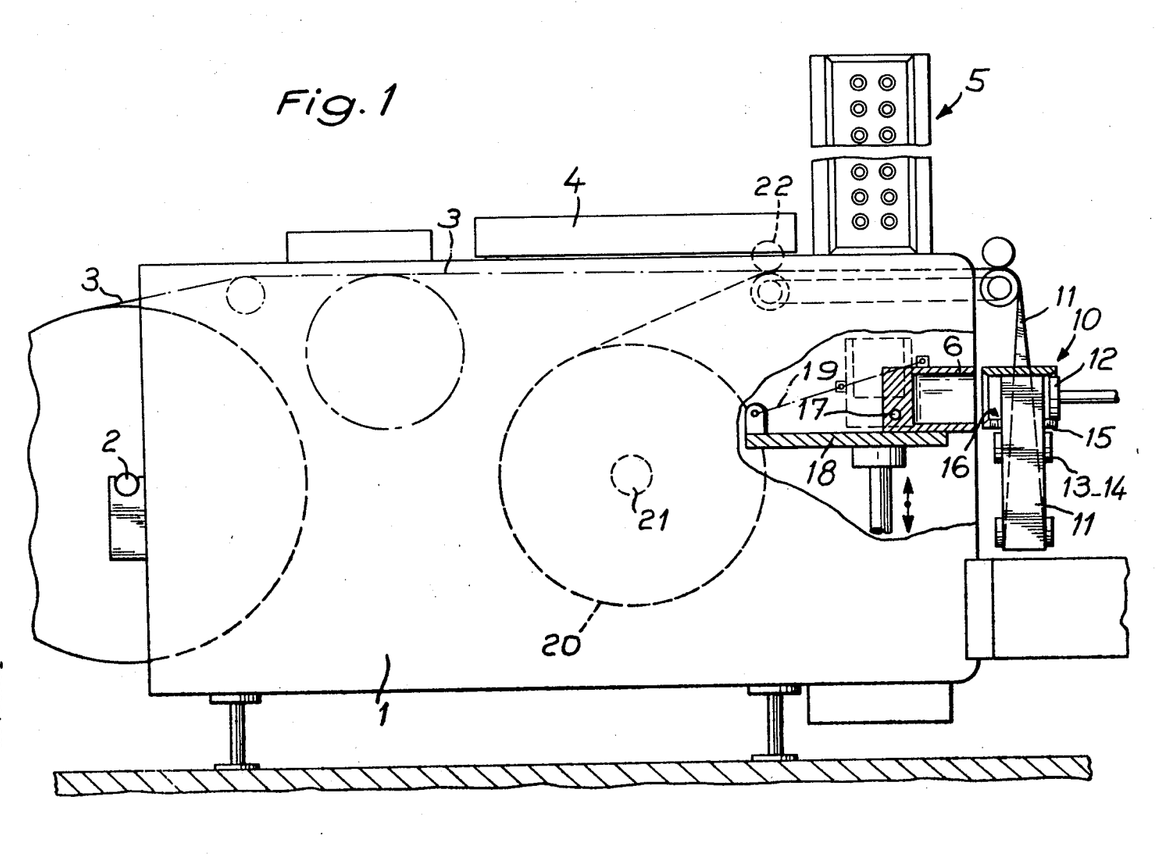
FIG. 1 is a lateral elevation of the apparatus according to the invention.
Figure 2:
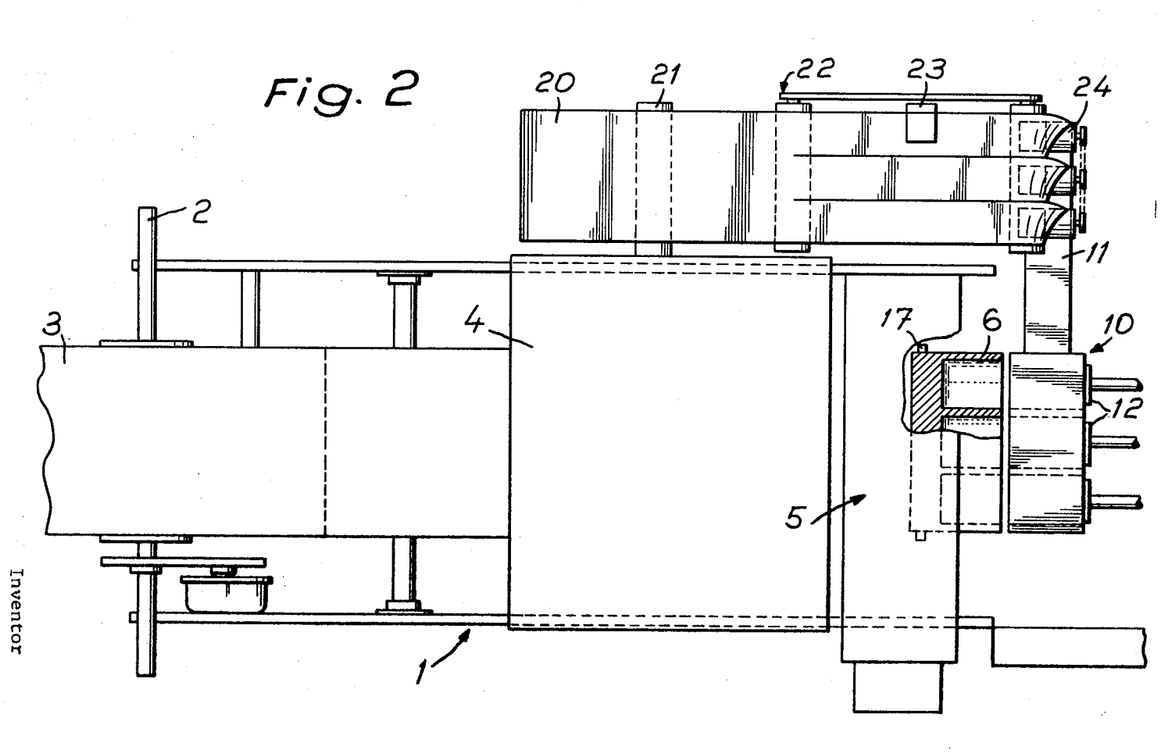
FIG. 2 is a partially broken away, plan view of the apparatus.

As is particularly shown in FIGS. 1 and 2, the apparatus for producing containers with complex walls comprises on its frame 1 a cylindrical support 2 for a roll of thermoplastic sheet 3, means (not shown) for guiding and transporting the sheet 3, a heating station 4 for softening the material forming the sheet, and a shaping station 5. The shaping station 5 comprises in per se known manner a series of female moulds 6 which are disposed on one side of the thermoplastic sheet 3, for example below the sheet 3, and a series of pre-shaping punches (not shown) of which the number is equal to the number of moulds but which are disposed on the other side of the thermoplastic sheet 3, and also mould clamps (not shown) for firmly applying the edge of a zone of thermoplastic sheet 3 against the upper end of the corresponding mould 6, means for moving the moulds 6 and the punches towards each other in a direction perpendicular to the plane of the thermoplastic sheet 3, and a source of pressure fluid to apply the blank, which is pre-shaped by the punch, against the internal wall of the mould 6.

Not shown in these figures are the other working stations which form part of an apparatus for producing containers with complex walls, these other stations being the container filling station, the sealing station, the severing station in which filled and sealed containers are severed, and, possibly, the over-wrapping station in which a plurality of grouped containers are wrapped together.

The present apparatus comprises a device 10 for forming a loop in a reinforcing sheet 11 and a member 12 for placing said reinforcing sheet 11 in the form of a loop in the corresponding mould 6 which is specially arranged so as to be capable of coming into alignment with the loop forming device 10 without it being necessary to displace or remove the thermoplastic sheet 3 which is engaged in the shaping station.

The loop forming device 10 comprises a certain number of return rollers which guide the reinforcing sheet 11 towards a pair of feed-in rollers 13, 14 provided on each side of a slot 15 which gives access to a cavity 16 of the loop forming device 10.

The loop forming device 10 is arranged in the apparatus at a location below the plane of movement of the thermoplastic sheet 3 and preferably downstream of the shaping station 5 and the female moulds 6 are articulated on a horizontal shaft 17 which is rigidly fixed to the carrier for the moulds 6 which are movable in a vertical direction, the carrier being provided with a control means 19 such as a jack to pivot the moulds 6 from their vertical position into a horizontal position in which they are in alignment with the corresponding cavities 16 of the loop forming device 10.

It is of advantage to produce the different reinforcing sheets or strips 11 from a single, wider sheet or strip, called the main sheet. There is therefore provided on one side of the frame 1, a cylindrical support 21 for a roll of main reinforcing sheet 20, a mechanism 22 for cutting the main sheet into individual strips 11, and a mechanism for the common, stepwise entrainment of the main reinforcing sheet and the different reinforcing sheets 11 cut into strip form.

When the reinforcing sheets 11, 20 carry decorative motifs and the motifs must be correctly positioned on the container relative to a reference point such as a lateral edge, the apparatus comprises a single setting photoelectric cell 23 preferably located opposite a reinforcing sheet 11 which has already been cut, a return roller 24 which is adjustable for position being interposed in the path of movement of each reinforcing strip 11 towards the corresponding cavities of the loop forming device 10. It is apparent that, taking into account the setting by the photoelectric cell 23 of a motif on one of the reinforcing sheets 11, and the different distances between the motif setting point and the various cavities 16 of the loop forming device 10, it is sufficient for the adjustable return roller to be slightly displaced for a portion of the reinforcing strip or sheet 11 which is provided with a complete motif, to be introduced into the corresponding cavity 16.

The loop forming device 10 also comprises means for cutting the portion of reinforcing sheet placed in the cavity 16. The cutting means more particularly comprise a fixed blade 25 and a movable blade 26 located on each side of the slot 15 leading to the cavity 16 of the loop forming device 10, the movable blade 26 being rhythmically displaced after each stepwise advance of the reinforcing sheet 11.

Figure 3:
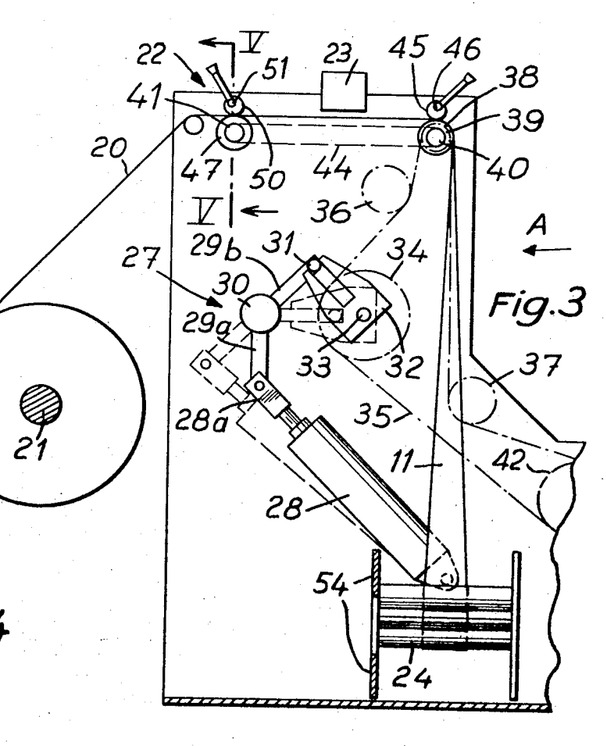
FIG. 3 is a lateral elevation showing in greater detail the means for the stepwise entrainment of the reinforcing sheet.
Figure 4:
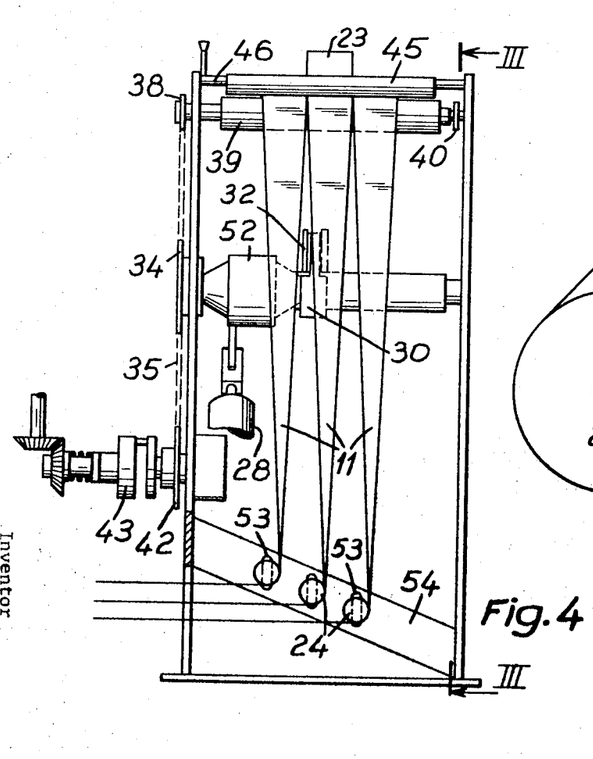
FIG. 4 is a front elevation of the entrainment means in the direction of the arrow A shown in FIG. 3.
Figure 5:
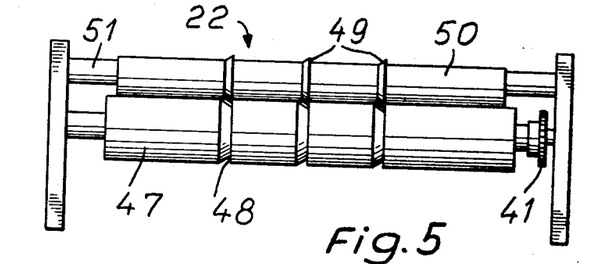
FIG. 5 is a section of a detail taken along the line V—V of FIG. 3.

FIGS. 3 to 5 show in greater detail the mechanism 27 for stepwise movement of the complete reinforcing sheet 20 and the different individual reinforcing sheets 11. The entrainment mechanism 27 essentially comprises a motor such as a hydraulic jack 28 which is articulated at its rear end to a frame and at its front end, that is to say by way of the shaft 28a, to a lever having two arms 29a, 29b which is capable of pivoting about a horizontal shaft 30. The front end of the arm 29b of the lever comprises a drive roller 31 which is capable of sliding in the recess of a fork member 32 which is articulated on a horizontal shaft 33 and which is integral with a toothed wheel 34 around which passes a drive chain 35.

It should also be noted that between the fork member 32 and the toothed wheel 34 there is provided a clutch-brake assembly or a free-wheel 52, to permit the jack 28 either to be contracted or extended without return movement of the drive chain 35. The drive chain 35 passes over two return gears 36, 37, one of the gears acting as a tensioning gear 36. The chain 35 co-operates with a toothed wheel 38 of a drive roller 39 for driving the reinforcing sheets or strips. The drive roller 39 comprises at its other end a toothed wheel 40 connected by a drive chain to a toothed wheel 41 of the mechanism 22 for cutting the main reinforcing sheet 20.

From the toothed wheel 38, the drive chain 35 passes around another toothed wheel 42 which is integral with the transmission 43 connected to the feed-in rollers 13, 14 of the loop forming device 10. The drive chain 35 is closed over the three toothed wheels 34, 38 and 42 while the other chain 44 is closed over the two toothed wheels 40, 41. The reinforcing strips 11 are entrained by means of a pressure roller 45 having an eccentric support shaft 46 and co-operating with the roller 39.

The mechanism 22 for cutting the main reinforcing sheet into individual sheets or strips 11 comprises, in a first embodiment, a support roller 47 which is integral with the toothed wheel 41 and which is provided with annular grooves of which a lateral vertical wall forms the blade cooperating member 48 for a cutting blade 49 provided on the external periphery of a hollow roller 50 which is supported eccentrically by a shaft 51 and applied against the support roller 47.

Arranged between the cutting mechanism 22 and the roller 39 is a setting photoelectric cell 23 or a similar device which is located opposite one of the cut sheets or strips 11 and which is intended to act on a control mechanism (not shown) in dependence on the setting marks which it reads on the reinforcing sheet 11.

The support roller 21 for the main reinforcing sheet or strip 20, the stepwise entrainment mechanism 27 and the cutting mechanism 22 are mounted beside the heating station 4 and the shaping station 5 in parallel to the path of movement of the thermoplastic sheet 3. In this way, it is easy to control the simultaneity of the advance movement of the thermoplastic sheet 3 and the reinforcing sheets 11, 20 and in addition, the apparatuses provided for the production of containers with a simple wall can easily be converted to apparatuses for the production of containers with complex walls.

On the other hand, in a preferred embodiment, the loop forming device 10 is disposed below the path of movement of the thermoplastic sheet 3 or the shaped containers, and close to the moulds 6 in their lower position. It is of advantage for the loop forming device 10 to be placed downstream of the shaping station 5.

As they leave the rollers 39, 45, the individual reinforcing sheets or strips 11 are diverted downwardly and progressively turned through 90° on themselves, by means of a number of controllable return rollers 24 corresponding to the number of individual sheets or strips 11. It should be noted that the return rollers 24 have their horizontal axes turned through 90° relative to those of the rollers 39, 45. The adjustable return rollers 24 are disposed at different levels, in order not to interfere with the movement of the sheets 11 passing over the other rollers 24. In addition, the shafts of the rollers 24 are adjustable, for example in height, and for this purpose are housed with their ends in vertical slots 53 formed in support plates 54. This disposition enables the portions of reinforcing sheet 11 to be correctly positioned in the cavity 16 and in particular provides for correct positioning of the decoration or inscription appearing on the reinforcing sheets 11. Thus, the reinforcing sheet 11 will always be found to be correctly positioned on the finished container relative to a reference point on the container.

Figure 6:
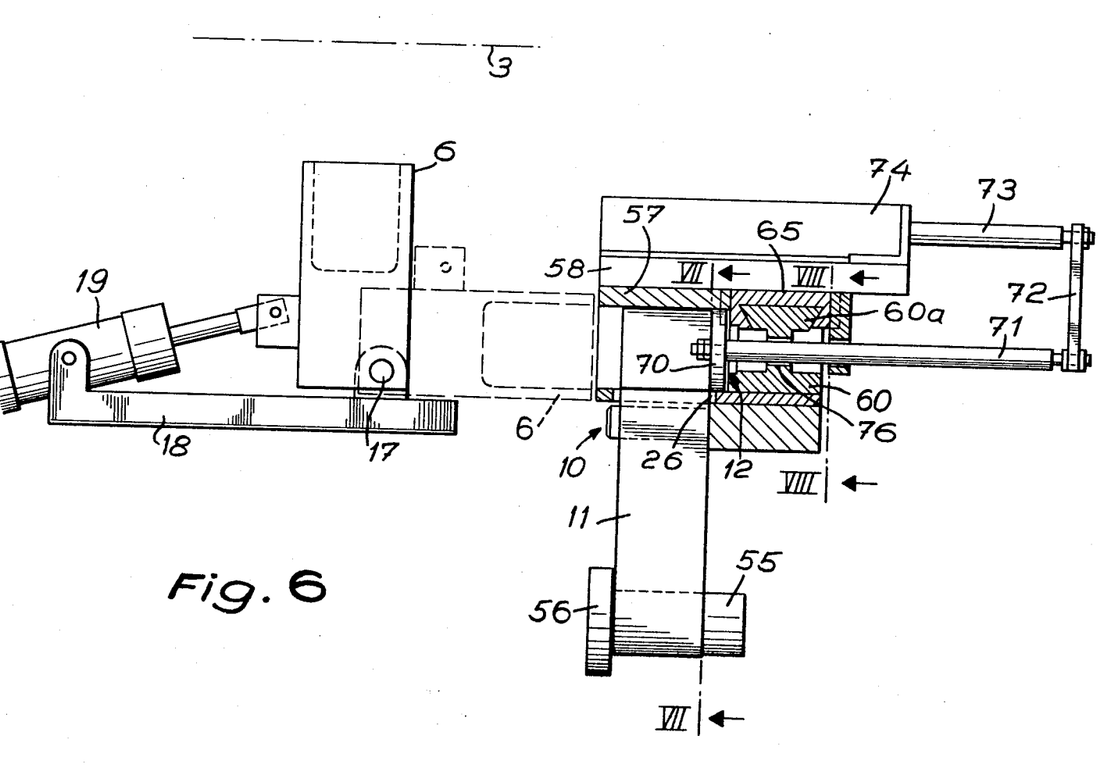
FIG. 6 is a lateral view of a vertical section taken along the line VI—VI of FIG. 7, and showing in detail the loop forming device already shown diagrammatically in FIGS. 1 and 2.
Figure 7:
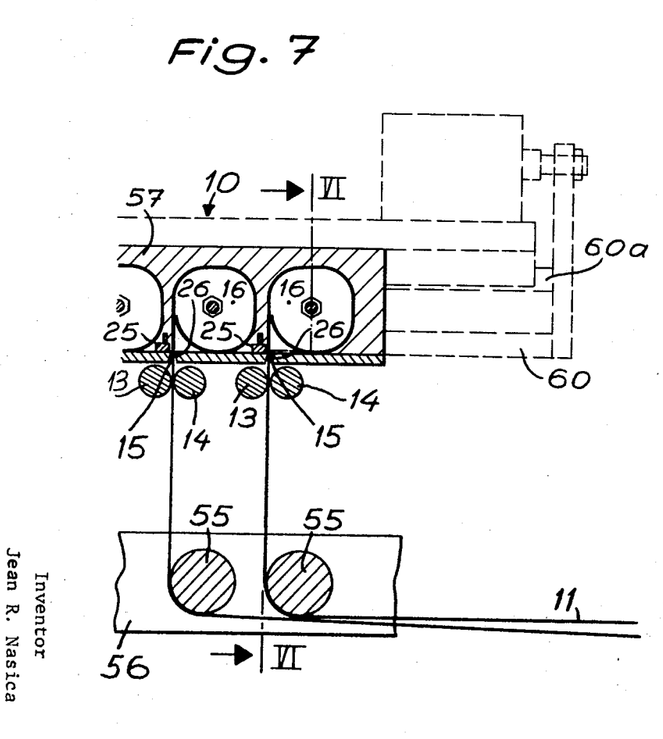
FIG. 7 is a detail front view of the loop forming device in section along the line VII—VII of FIG. 6.
Figure 8:
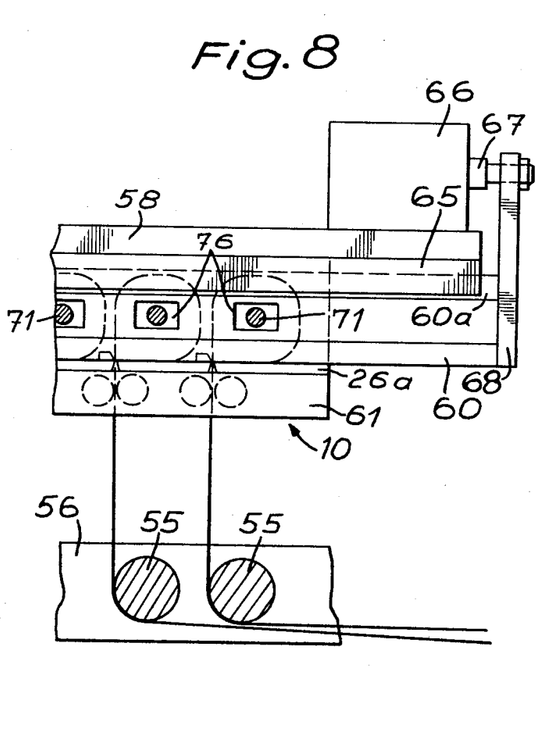
FIG. 8 is a detail front view of the loop forming device in section taken along the line VIII—VIII of FIG. 6.

As can be seen in greater detail in FIGS. 6, 7 and 8, the reinforcing sheet 11 passing from the controllable return roller 24 passes around another return roller 55 mounted on a horizontal support bar 56, before reaching the loop forming device 10.

The loop forming device 10 comprises a horizontal transversal bar 56 mounted on a support plate 58 which is integral with the frame of the apparatus. The transversal bar 57 is provided with a certain number of cavities 16 which are preferably cylindrical in shape but in which the base, and consequently, the transverse section, can be circular as well as square or rectangular, etc., and more generally, are determined by a line which is closed on itself, any angles preferably being rounded off to form a circular arc. It should also be noted that the inside face of the cavity 16, at the point at which it is connected laterally to the exterior by way of the slot 15, can form a right angle. The slot 15 leading into the cavity 16 is formed, in a preferred embodiment, in the cutting blade 26 mounted on a support 60 which is movable transversely to the plane in which the reinforcing sheet 11 is fed into the cavity 16. The fixed blade co-operating member 25 is provided in the corresponding cavity 16 and is merged with the wall located at least partially in alignment with the slot 15. In addition, the movable cutting blade 26 forms a part of the inside face of the cavity 16. A pair of feed-in rollers 13, 14 is mounted in front of each slot 15, for example on a bar 61 which is integral with the solid portion 26a of the movable blade 26 which is fixed on the movable support 60. The pair of feed-in rollers 13, 14 is controlled by the stepwise entrainment mechanism 27 and in particular by the intermediary of the transmission 43 (see FIG. 4) on which is fitted a friction system with bevel gear 43a for each pair of feed-in rollers 13, 14. The rear portion which is in the form of a dovetail 60a, of the movable support 60 is guided in a slide 65 fixed to the frame. Mounted on the slide 65 is a jack 66 of which the shaft 67 is integral with the movable support 60 through the intermediary of strut 68. It should also be noted that the diameter of the feed-in rollers 13, 14 is slightly larger than that of the roller 39 for moving the reinforcing sheets. However the two rollers 13, 14 which act on the reinforcing sheet are driven by friction such that each reinforcing sheet is individually tensioned.

In addition, this friction system permits the manual insertion of each reinforcing sheet into the rollers 13, 14 and into the cavity, by starting operation of the assembly. Thus, the reinforcing sheet 11 is constantly tensioned until introduced into the cavity 16. The cutting movement is effected by means of the jack 66 of which the piston carries out a reciprocating movement of a few millimeters. This embodiment which is described as a preferred example affords the advantage that even when the portion of reinforcing sheet placed in the cavity 16 is cut from the reinforcing sheet 11 in strip form, the free end of the latter always remains engaged in the slot 15, the feed-in rollers 13, 14 preventing the reinforcing sheet 11 moving rearwardly and becoming disengaged from the slot 15.

Once the portion of reinforcing sheet has been cut, it is pushed into the mould 6 which, for this purpose, is in alignment with the corresponding cavity 16. It will be noted that the internal circumference of the mould 6 is at least slightly greater than that of the cavity 16 of the loop forming device 10.

The member 12 for positioning the cut and loop-shape rolled reinforcing sheet 11 generally comprises a plate 70 of which the section is substantially identical to the section of the cavity 16, this plate being fixed to the end of a rod 71 of which the other end is fixed by way of a strut 72 to the rod 73 of a second control jack 74 mounted on the cross member 58 of the frame. Obviously, at the location at which the rod 71 passes through the movable support 60, the latter has an oblong aperture 76, the length of which takes into account the maximum travel of the movable support 60.

The above described embodiment comprises a series of moulds disposed in a single line. In another embodiment of the invention, there are provided two lines of grouped moulds, such that, considered in the direction of advance movement of the sheet 3, there are always two moulds disposed one behind the other. It is obvious that a similar arrangement must be used in that case for the pre-shaping punches and the mould clamps in the shaping station. In this case, the loop forming device 10 comprises two superposed rows of cavities 16, the cavities of the upper row having upwardly open feed slots 15 and the cavities of the lower row having their slots opened downwardly. In this case, the feed-in rollers 13, 14 are arranged, as regards the upper row of cavities, above the corresponding slots, while those associated with the lower row of cavities are arranged below the corresponding slots. It will be easily understood that the reinforcing sheets or strips intended to be introduced into the cavities of the upper row each pass by way of at least two supplementary return rollers before being engaged into the corresponding pair of feed-in rollers.

It is of advantage to provide for the cutting blades of the upper row and the lower row of cavities, a common control jack. Similarly, the different members for positioning a cut and rolled portion of the reinforcing sheet are preferably connected by their rods and controlled by a single jack similar to the jack 74.

In order further to improve the positioning of the cut portions of reinforcing sheet, the lateral wall of the mould 6 is provided at certain locations with very fine channels which open on the one hand on to the inside lateral face of the mould and on the other hand, into a chamber formed in the said wall of the mould and capable of being connected to a vacuum pump. Thus, when the portion of reinforcing sheet has been positioned in the mould, the vacuum generated behind that portion of reinforcing sheet keeps it in place and prevents any displacement which could be caused by the blank when it is formed and/or applied against the inside wall of the mould. By virtue of this step, the cut portion of the reinforcing sheet is rigorously positioned.

The openings into the mould of these suction passages are preferably provided at locations on the inside wall of the mould at which that face affords changes in direction or more or less accentuated angles. With that arrangement, under the effect of the vacuum linked with the suction channels, the portion of reinforcing sheet is sucked towards the angular zones of the mould, and pre-shaping of this portion of reinforcing sheet is achieved in this way. It should also be noted that the portion of reinforcing sheet does not necessarily extend over the entire height of the container to be produced, but on the contrary may cover only a certain area, for example close to the upper end of the container. Obviously, in order for the reinforcing effect to be at a maximum, the portion of reinforcing sheet should cover the entire circumference of the container.

Hitherto, the portions of or loop in the reinforcing sheet 11 were cut along a line perpendicular to the straight edges of the sheet. This manner of cutting the sheets formed into loops is particularly advantageous when the containers to be produced, and therefore the moulds, have straight cylindrical walls.

In the case of containers of frustoconical shape, it is known that the reinforcing sheet 11 may be made into a corresponding shape, but opened out to lie in one plane. In other words, each portion of the reinforcing sheet, which is intended to cover at least partially the lateral wall of the frustoconical container, is in the form of part of a ring, the lateral edges of which correspond to the periphery of the circle of the large base of the frustoconical container, and the periphery of the circle of the small base of the container.

In an alternative embodiment of the apparatus, the different successive portions of the reinforcing sheet or strip adhere at least by way of a part of their rearward edge to the front edge of the following portion, and the straight lines delimiting the front and rear edges of each portion are parallel to each other, the straight line at the rearward end of each portion coinciding with the line along which the portion of sheet introduced into the cavity of the loop forming device is cut. This cut line can moreover coincide with a generating line of the frustoconical container.

Figure 9:
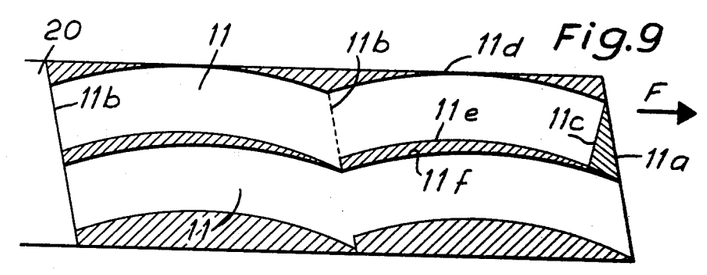
FIG. 9 is a plan view of a pattern for cutting the main reinforcing sheet into individual sheets.

FIG. 9 shows a first embodiment of the reinforcing sheet or strip 11. In this figure, two reinforcing strips 11 are cut from a main reinforcing sheet or strip 20, to form portions of annular shape. Here, the arrow F indicates the direction in which the sheet is introduced into the cavity 16 of the loop forming device. The forward end 11a of each portion of reinforcing sheet is parallel to the rearward end 11b which forms the cut line of each portion and which at the same time, can coincide with a generating line of the frustoconical container.

In addition, the front end of each portion of reinforcing strip, once set in position on the frustoconical container, is covered by the rearward end of that portion over a zone delimited by the forward straight line 11a, by a straight line 11c which coincides with the generating junction line when the portion of sheet is rolled into a frustoconical shape, and by a part of the circular arc located between the two straight lines 11a and 11c.

It should be noted that the different portions of the reinforcing sheet 11 remain integral with each other by way of at least a part of their front and rearward straight lines 11a and 11b until they are cut by the loop forming device 10.

As regards the lateral edges 11d and 11e of the reinforcing sheets 11, they are cut by a mechanism comprising a punch and a cutting die, from the main reinforcing sheet 20. This cutting mechanism is generally located upstream of the photoelectric cell 23.

It is of advantage for the different sheets 11 to be grouped as close to each other as possible, while taking into account the different curvature of the lateral edges 11d and 11e of each portion between two corresponding portions of two adjacent reinforcing sheets to be cut from the main sheet 20, so as to obtain an intermediate, relatively narrow zone 11f, which enables wastage to be very low.

Figure 10:
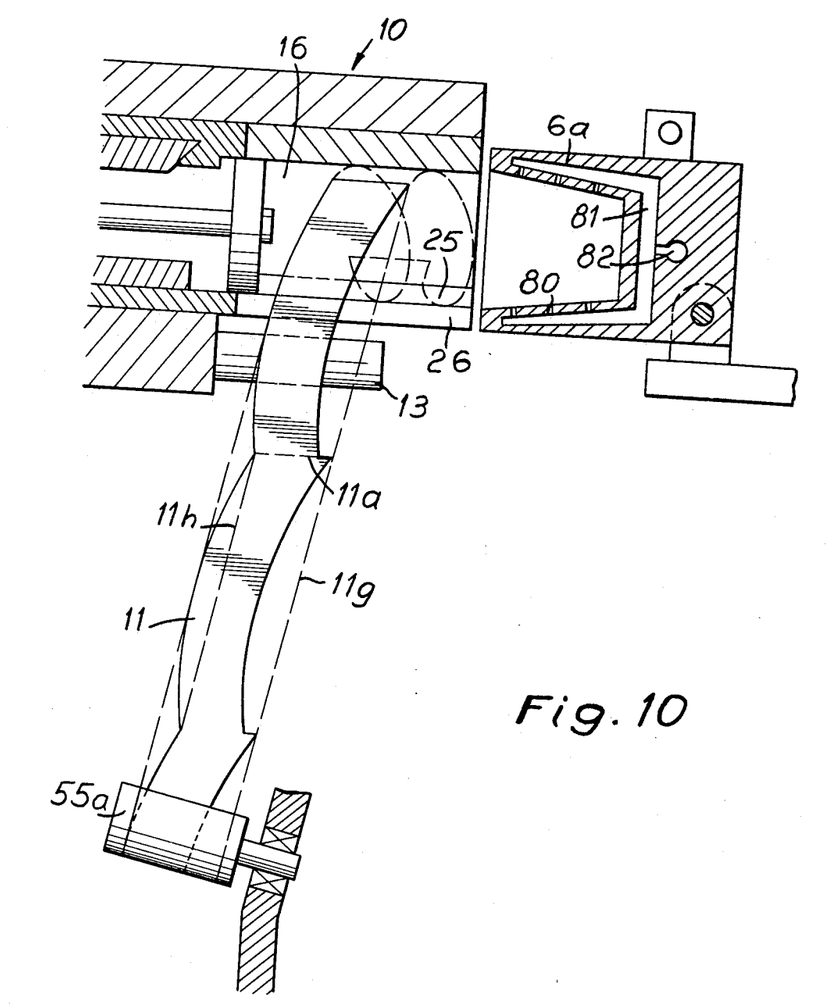
FIG. 10 is a lateral view of a detail of the loop forming device, including the particular arrangement of a return roller.

FIG. 10 shows diagrammatically a mode of introducing a reinforcing sheet 11 into the corresponding cavity of the loop forming device 10, the sheet being as shown in FIG. 9. It is important that the rearward end 11b of each portion of the reinforcing sheet, along which end the sheet will be cut by means of the cutting blades 25 and 26, should be parallel to the direction of those blades and consequently to the generating lines of the cylindrical cavity 16.

For this purpose the shaft of the return roller 55a which is located, considered in the direction of movement of the sheet 11, upstream of the feed-in rollers 13, 14, is perpendicular to the imaginary straight line 11g or 11h which joins the ends of the same lateral edge of a portion of reinforcing sheet 11, the rearward end 11b of each portion being parallel to the cutting blades 25 and 26.

In addition, because the portion of reinforcing sheet introduced into the cavity 16 is wound in a helical form, the height of the cavity 16 is equal to at least twice the height of the reinforcing strip 11, taken along the straight line 11a.

FIG. 10 also shows that the mould 6a used has an inside frustoconical wall on the surface in which open channels 80 which communicate with a collecting chamber 81 which is itself connected by way of a conduit 82 to a vacuum pump.

The other elements shown in this figure are identical to those of the above described embodiments and are provided for this reason with the same reference numerals.

Figure 11:
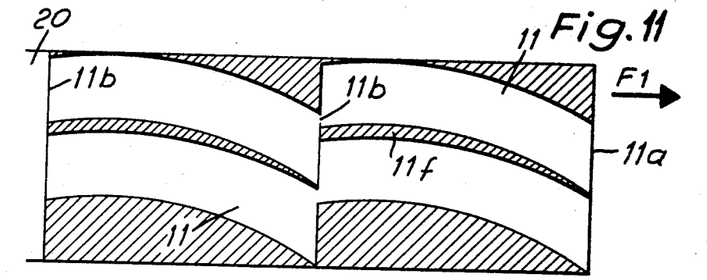
FIG. 11 is a plan view of another pattern for cutting the main reinforcing sheet into individual sheets.

FIG. 11 shows another pattern for punch and die cutting the different reinforcing sheets 11 from a main reinforcing sheet 20.

The reinforcing sheet 11 as shown in FIG. 11 does not require return rollers set at an angle relative to the cutting edge of the blades 25 and 26.

It should be noted that in the present case, the straight lines 11b along which the reinforcing sheet 11 will be cut into successive portions, are perpendicular to the direction of movement $F_1$ of the reinforcing sheet 11.

In addition, the width of the zone in which the two portions of reinforcing sheet are attached to each other during movement of the reinforcing sheet 11, is at least equal to one quarter of the width of the cut portion of sheet.

Figure 12:
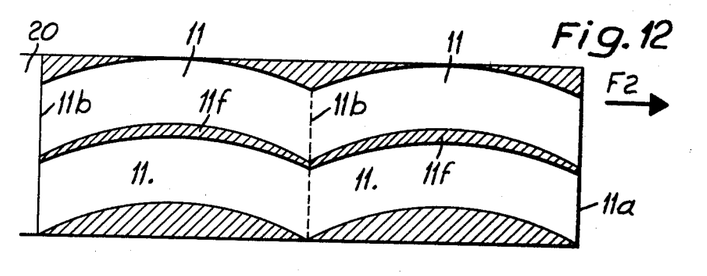
FIG. 12 is a plan view of another pattern for cutting the main reinforcing sheet into individual sheets.

FIG. 12 shows yet another pattern for punch and die cutting of the different reinforcing sheets 11 from a main reinforcing sheet 20. In this case too, the straight lines 11b along which the reinforcing sheet 11 will be cut into successive portions, are perpendicular to the direction of movement $F_2$ of the reinforcing sheet 11. This cutting pattern is particularly advantageous by reason of the small offcuts on the one hand, and because the two successive portions of reinforcing sheet are attached to each other during transportation over the entire width of the reinforcing sheet 11.

Obviously, the different reinforcing sheets can be cut out using other patterns.

However, the important fact as regards the present invention lies in the fact that the portions of reinforcing sheets remain attached to each other by way of their front and rear edges until they are completely introduced into the cavity of the loop forming device 10.

I CLAIM:

1. Apparatus for producing containers with complex walls, comprising on a frame,
   a. a cylindrical support for a roll of thermoplastic sheet,
   b. means for transporting said sheet below a heating station, then into a shaping station comprising on one side of the thermoplastic sheet at least one series of female moulds which are movable perpendicularly to the plane of the thermoplastic sheet and which extend over the entire width of said sheet, and on the other side,
   c. a series of pre-shaping punches of which the number corresponds to the number of moulds,
   d. a series of mould clamps intended to apply said thermoplastic sheet against the upper end of the moulds, and
   e. a source of pressure fluid for the definitive shaping of the containers,
   f. characterized in that associated with each female mould is
   g. a device for forming a loop in the reinforcing sheet, and
   h. a member for placing said loop in the corresponding mould,
   i. and that said mould is disposed on a carrier so as to be capable of coming into alignment with the loop forming device, and
   j. that means are provided to control, stepwise and sequentially,
   k. the formation of a loop in the reinforcing sheet,
   l. the alignment of the mould and the forming device,
   m. the introduction of the loop into the mould,
   n. the resetting of the mould into the shaping position, and
   o. the shaping of a container with complex walls.

2. An apparatus according to claim 1, characterized in that
   a. the loop forming device comprises a series of return rollers which guide the reinforcing sheet towards a pair of feed-in and
   b. drive rollers provided on each side of a slot which gives access to a cavity of the loop forming device.

3. An apparatus according to claim 2, characterized in that
   a. the loop forming device is arranged in the apparatus at a location below the plane of movement of the thermoplastic sheet and close to the shaping station and
   b. the female moulds are articulated on a horizontal shaft which is rigidly fixed to the carrier for the moulds which are movable in a vertical direction,
   c. the carrier being provided with a control means to pivot the moulds from their vertical position into a horizontal position in which they are in alignment with the corresponding cavities of the loop forming device.

4. An apparatus according to claim 1, characterized in that on one side of the frame there is provided
   a. a cylindrical support for a roll of main reinforcing sheet,
   b. a mechanism for cutting the main sheet into individual strips, and
   c. a mechanism for the common, stepwise entrainment of the main reinforcing sheet and the different reinforcing sheets cut into strip form.

5. An apparatus according to claim 1, characterized in that
   a. a single setting photoelectric cell is located opposite a reinforcing sheet,
   b. a return roller which is adjustable for position being interposed in the path of movement of the reinforcing strips or sheets towards the corresponding cavities of the loop forming device.

6. An apparatus according to claim 3, characterized in that the loop forming device comprises means for cutting the portion of reinforcing sheet placed in the cavity.

7. An apparatus according to claim 6, characterized in that the cutting means comprise
   a. a fixed blade
   b. and a movable blade located on each side of the slot leading to the cavity of the loop forming device, the movable blade being displaced rhythmically after each stepwise advance of the reinforcing sheet.

8. An apparatus according to claim 4, characterized in that the mechanism for cutting the main sheet into individual sheets or strips comprises a support roller connected to the drive wheel and provided with annular grooves of which a lateral vertical wall forms the blade cooperating member for a cutting blade provided on the external periphery of a hollow roller which is supported eccentrically by a shaft and applied against the support roller.

9. An apparatus according to claim 4, characterized in that the support roller for the main reinforcing sheet or strip, the stepwise entrainment mechanism and the cutting mechanism are mounted beside the heating and shaping station parallel to the path of movement of the thermoplastic sheet.

10. An apparatus according to claim 3, characterized in that the device for forming loops in the individual reinforcing sheets is disposed below the path of movement of the thermoplastic sheet or the shaped containers, and close to the female moulds in their lower position, and close to the shaping station.

11. An apparatus according to claim 1, characterized in that the loop forming device comprises
   a. a horizontal transversal bar mounted on a support plate which is integral with the frame of the apparatus, and provided with
   b. a certain number of cavities of which each is connected laterally to the exterior by a slot formed in a cutting blade mounted on a support which is movable transversely to the plane in which the reinforcing sheet is fed into the cavity,
   c. a fixed blade co-operating member being provided in each cavity in the wall located at least partially in alignment with the slot.

12. An apparatus according to claim 2, characterized in that the diameter of the feed-in rollers is slightly greater than that of the roller for entraining the reinforcing sheets, the feed-in rollers are driven individually by a friction system such as to permit the tensioning of each reinforcing sheet and the introduction of each reinforcing sheet into the cavity, each time that the apparatus is set in operation.

13. An apparatus according to claim 1, characterized in that the member for positioning the cut and loop-shape rolled reinforcing sheet comprises a plate of which the section is substantially identical to the section of the cavity, said plate being fixed to the end of a rod of which the other end is fixed by way of a strut to the rod of a second control jack fixed on a cross member.

14. An apparatus according to claim 1, characterized in that the moulds are grouped in two lines of moulds disposed such that, considered in the direction of advance movement of the thermoplastic sheet, there are always two moulds in alignment one behind the other, the pre-shaping punches, the mould clamps, the cavities of the loop forming device and the members for positioning the cut portion of reinforcing sheet being disposed similarly in two grouped lines.

15. An apparatus according to claim 14, characterized in that the access slots of the upper row of cavities are open upwardly and the corresponding feed-in rollers are disposed above the upper row of cavities, while the access slots of the lower row of cavities are open downwardly and the corresponding feed-in rollers are arranged below said lower row.

16. An apparatus according to claim 3, characterized in that each female mould is provided at certain locations with very fine suction channels which open on the one hand on to the inside lateral face of the mould and on the other hand, into a chamber formed in the said wall of the mould and capable of being connected to a vacuum pump.

17. An apparatus according to claim 1, characterized in that the openings of the suction channels are provided at locations on the inside wall of the mould at which that face affords changes in direction or more or less accentuated angles.

18. An apparatus according to claim 4, characterized in that the mechanism for cutting the main sheet into individual strips is of the punch and die type and is arranged such that the cut strips comprise successive portions which are integral with each other by way of at least a part of their front and rear ends, the straight lines delimiting the one and the other ends being parallel and the rearward straight line coinciding with a generating line of the container after the portion of reinforcing sheet has been secured to said container made in the mould.

19. An apparatus according to claim 1, characterized in that the axis of the return roller locates upstream of the feed-in rollers of the loop forming device is inclined relative to the edges of the cutting blades of said device, such that the rearward end of each portion of reinforcing sheet is parallel to the cutting blades and that the axial height of the cavities of the loop forming device is equal to at least twice the height or the width of the reinforcing sheet.

20. An apparatus according to claim 4, characterized in that the mechanism for cutting the main sheet into individual reinforcing strips is of the punch and die type and is arranged such that the cut strips comprise successive portions which are integral with each other by way of at least one part of their front and rear ends, the straight lines delimiting the one and the other ends being parallel and perpendicular to the direction of movement of the individual reinforcing strips.

21. An apparatus according to claim 20, characterized in that the rearward straight line coincides with a generating line of the container after the portion of reinforcing sheet has been secured to said container made in the mould.

22. An apparatus according to claim 20, characterized in that the rearward straight line forms an angle with a generating line of the container after the portion of reinforcing sheet has been secured to said container made in the mould.

23. An apparatus according to claim 1, characterized in that the inside wall of the female moulds is of a frustoconical shape of which the large base is completely open.

24. In an apparatus for producing a container with composite walls from a sheet of thermoplastic material and a loop of reinforcing material,
   a. a female mold,
   b. a loop forming device located outside of said mold,
   c. means for temporarily aligning said mold axially with said loop forming device, and
   d. means for introducing a reinforcing loop formed in said loop forming device into said mold.

25. An apparatus according to claim 24, wherein said loop forming device comprises a cavity having a slot in a side wall thereof and means for feeding a strip of reinforcing material through said slot and into said cavity in a direction transverse to the axis thereof.

26. An apparatus according to claim 24 wherein a preshaping punch cooperates with said female mold and said plastic sheet for initiating the formation of a container.

27. In an apparatus for producing a container with composite walls from a sheet of thermoplastic material and a loop of reinforcing material, a combination comprising a female mould; a loop forming device associated with said female mould and provided with a cavity bounded by a side wall having a slot formed therein; means for temporarily aligning said mould axially with said loop forming device; means for feeding a strip of reinforcing material through said slot and into said cavity in a direction transverse to the axis of the latter so as to form a reinforcing loop therein; and means for introducing the thus formed reinforcing loop from said loop forming device into said female mould.

28. In an apparatus for producing a container with composite walls from a sheet of thermoplastic material and a loop of reinforcing material, a combination comprising a female mould; a loop forming device associated with said female mould; means for temporarily aligning said female mould axially with said loop forming device; means for introducing a reinforcing loop formed in said loop forming device into said mould; and a pre-shaping punch cooperating with said female mould for acting upon a plastic sheet associated with said mould so as to initiate the formation of a container.

* * * * *